United States Patent
Kasahara (10) Patent No.: US 8,120,666 B2
(45) Date of Patent: Feb. 21, 2012

(54) IMAGE PICKUP APPARATUS

(75) Inventor: Ryosuke Kasahara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 477 days.

(21) Appl. No.: 12/259,561

(22) Filed: Oct. 28, 2008

(65) Prior Publication Data
US 2009/0135277 A1    May 28, 2009

(30) Foreign Application Priority Data
Nov. 26, 2007 (JP) ................................. 2007-304417

(51) Int. Cl.
*H04N 5/228* (2006.01)
*H04N 5/232* (2006.01)
*H04N 9/04* (2006.01)

(52) U.S. Cl. ...................... 348/222.1; 348/335; 348/272

(58) Field of Classification Search .................. 348/242, 348/246, 269–282, 335, 22.1, 251
See application file for complete search history.

(56) References Cited

U.S. PATENT DOCUMENTS

| | | | |
|---|---|---|---|
| 6,538,691 B1 * | 3/2003 | Macy et al. ................. | 348/222.1 |
| 6,747,702 B1 | 6/2004 | Harrigan | |
| 6,762,792 B1 | 7/2004 | Matsumura | |
| 6,903,733 B1 | 6/2005 | Greenberg et al. | |
| 7,142,238 B1 * | 11/2006 | Sawada et al. ................. | 348/252 |
| 7,245,319 B1 * | 7/2007 | Enomoto .................... | 348/222.1 |
| 8,014,626 B2 * | 9/2011 | Chiba .......................... | 382/274 |
| 2004/0202380 A1 | 10/2004 | Kohler et al. | |
| 2004/0227978 A1 | 11/2004 | Enomoto | |
| 2005/0213159 A1 | 9/2005 | Okada et al. | |
| 2006/0115163 A1 * | 6/2006 | Nagaoka et al. .............. | 382/209 |
| 2006/0274170 A1 * | 12/2006 | Azuma ......................... | 348/246 |
| 2007/0103564 A1 * | 5/2007 | Chiba ......................... | 348/223.1 |

FOREIGN PATENT DOCUMENTS

| | | |
|---|---|---|
| EP | 1 175 101 A1 | 1/2002 |
| JP | 2000-069343 A | 3/2000 |
| JP | 2006-345053 | 12/2006 |
| JP | 2006-345054 | 12/2006 |
| JP | 2006-345055 | 12/2006 |
| JP | 2006-345056 | 12/2006 |

* cited by examiner

*Primary Examiner* — David Ometz
*Assistant Examiner* — Ahmed A Berhan
(74) *Attorney, Agent, or Firm* — Dickstein Shapiro LLP (57) ABSTRACT

An image pickup apparatus including a chromatic aberration of magnification correction device to correct chromatic aberration of magnification of an image by converting coordinates of pixel data of multiple color components of the image using multiple first coordinate conversion memories corresponding to the multiple color components and a distortion correction device to correct distortion of the image corrected with regard to the chromatic aberration of magnification by converting coordinates of the pixel data of multiple color components of the image at one time using a second coordinate conversion memory shared by the multiple color components.

7 Claims, 7 Drawing Sheets

FIG. 1

ENTIRE FUNCTION BLOCK DIAGRAM

PRIOR ART

CORRECTION OF CHROMATIC ABERRATION OF MAGNIFICATION (b)

CORRECTION OF DISTORTION

FIG. 7

CONFIGURATION OF CHROMATIC ABERRATION
OF MAGNIFICATION CORRECTION UNIT

FIG. 8

EMBODIMENT OF COORDINATE CONVERSION
COMPUTING UNIT FOR CORRECTING CHROMATIC
ABERRATION OF MAGNIFICATION

FIG. 9

CONFIGURATION OF DISTORTION CORRECTION UNIT

IMAGE PICKUP APPARATUS

BACKGROUND OF THE INVENTION

1. Field of the Invention

The present invention relates to an image pickup apparatus using a technology to correct chromatic aberration of magnification and distortion for obtained images.

2. Discussion of the Background

In recent years, demand for a wide-angle image pickup apparatus for a rear view monitor for cars, etc. has been increasing. However, as the angle of view widens, chromatic aberration of magnification and distortion increase. Therefore, designing an optical system combining minimal aberration is difficult, and there is a need to improve performance together with image processing.

In general, although distortion is the same for each color component of red, green and blue (RGB), chromatic aberration of magnification varies depending on the color component. In addition, distortion has a relatively large impact in comparison with chromatic aberration of magnification.

A typical image pickup apparatus using an optical system having chromatic aberration of magnification and distortion uses an aberration correcting method in which chromatic aberration of magnification and distortion are simultaneously corrected by separately converting coordinates of each color component of RGB at a later stage using red, green, and blue color signals obtained by an image pickup apparatus such as a charge coupled device (CCD) and a complementary metal-oxide semiconductor (CMOS) sensor, or in which only distortion is corrected by simultaneously converting coordinates of each color component of RGB while chromatic aberration of magnification is ignored.

The method in which chromatic aberration of magnification and distortion are simultaneously corrected by independently converting coordinates of each color component of RGB requires a memory which can independently assign addresses for RGB components, resulting in an expensive memory having 3 ports with a 3-chip structure. Furthermore, random access is required for coordinate conversion, and thus, a 3 port random access memory is required to correct chromatic aberration of magnification. Therefore, even when a typical single port exterior DRAM is used as a 3 port RAM by boosting the driving frequency of the DRAM for time sharing, the pixel rate is necessary to improve the definition and the frame rate does not increase due to access latency.

Furthermore, a memory having a large capacity such as a frame buffer to store data for one entire image is required to correct distortion.

That is, such a typical method which simultaneously corrects chromatic aberration of magnification and distortion by independent coordinate conversion for each color component of RGB needs a large capacity memory with a small latency such as an SRAM when randomly accessed or with multiple ports. However, an SRAM having a large capacity or a memory having multiple ports is extremely expensive, which significantly boosts the cost of a high definition device requiring a large capacity.

On the other hand, the method which corrects only distortion by coordinate conversion shared by each color component of RGB requires a large capacity memory but can use an inexpensive single chip structured memory such as a DRAM. However, such a method is not applicable in a case in which a wide angle of view is demanded, and because the resulting chromatic aberration of magnification is not ignorable.

SUMMARY OF THE INVENTION

Because of these reasons, the present inventor recognizes that a need exists for an image pickup apparatus in which functions of correcting chromatic aberration of magnification and distortion are cost effectively installed even for a high definition image having a high frame rate.

Accordingly, an object of the present invention is to provide an image pickup apparatus in which functions of correcting chromatic aberration of magnification and distortion are cost effectively installed even for a high definition image having a high frame rate. Briefly this object and other objects of the present invention as hereinafter described will become more readily apparent and can be attained, either individually or in combination thereof, by an image pickup apparatus including a chromatic aberration of magnification correction device to correct chromatic aberration of magnification of an image by converting coordinates of pixel data of multiple color components of the image using multiple first coordinate conversion memories corresponding to the multiple color components; and a distortion correction device to correct distortion of the image corrected with regard to the chromatic aberration of magnification by converting coordinates of the pixel data of multiple color components of the image at one time using a second coordinate conversion memory shared by the multiple color components.

It is preferred that, in the image pickup apparatus mentioned above, the first coordinate conversion memories are memories having a low capacity with a low latency or a low capacity with multiple ports and the second coordinate conversion memory is a memory having a high capacity with a high latency or a high capacity with a single port in comparison with the memories for the first coordinate conversion memories.

It is still further preferred that, in the image pickup apparatus mentioned above, the first coordinate conversion memories are SRAMs and the second coordinate conversion memory is a DRAM.

It is still further preferred that, in the image pickup apparatus mentioned above, the chromatic aberration of magnification correction device converts the coordinates of the pixel data of the multiple color components except for pixel data for a particular color component.

It is still further preferred that, in the image pickup apparatus mentioned above, the chromatic aberration of magnification correction device obtains an amount of correction based on coordinates of the particular color component, and conversion coordinates of each color component other than the particular color component are calculated based on the amount of correction.

It is still further preferred that, in the image pickup apparatus mentioned above, the multiple color components comprise red (R) signals, green (G) signals, and blue (B) signals, and the particular color component is green.

It is still further preferred that the image pickup apparatus mentioned above, the image pickup apparatus further includes a far infrared (FIR) filter configured to filter a brightness signal and located between the chromatic aberration of magnification correction device and the distortion correction device.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present invention will be described below in detail with reference to several embodiments and accompanying drawings. The color components of red (R), green (G) and blue (B) of additive primaries are used in the following description but the subtractive primaries of yellow (Y), magenta (M) and cyan (C) can be also used therein.

Figure 1:
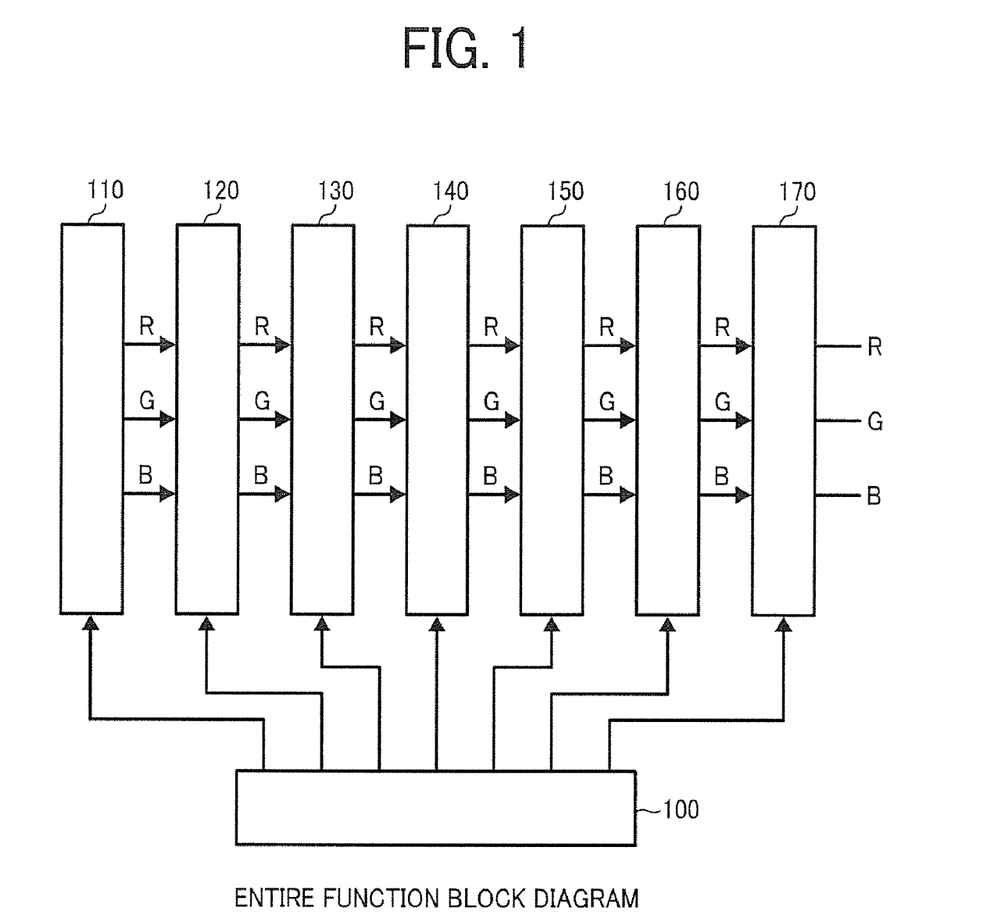
FIG. 1 is a block diagram illustrating one Embodiment of the image pickup apparatus of the present invention.

FIG. 1 is a function block diagram illustrating an embodiment of the image processing system of the image pickup apparatus according to the present invention. The image pickup apparatus includes other devices such as an operation unit (not shown), an image storage unit (not shown) and an image display portion (not shown).

In FIG. 1, a control unit 100 controls each unit in a pipeline manner by transmitting a control signal for each unit in the image pickup apparatus.

An image pickup element 110 is formed of, for example, a CCD or a CMOS sensor, which converts an optical image picked up by a wide angle optical system (not shown) having a large chromatic aberration of magnification and a large distortion into electric signals (pixel data). The image pickup element 110 includes color filters arranged according to Bayer arrangement. The RGB pixel data arranged based on Bayer arrangement are sequentially output according to coordinate data (x,y) provided by the control unit 100. The control unit 100 also sequentially provides the coordinate data (x,y) provided to the pickup element 110 to later stages with a particular time interval.

An A/D converter 120 converts analogue signals (i.e., RGB pixel data on Bayer arrangement) output from the image pickup 110 into digital signals, which is transmitted to a Bayer complement unit 130. In this Embodiment, the digital signals are formatted based on 8 bits for each color component of RGB.

The Bayer complement unit 130 inputs RGB pixel data on Bayer arrangement which has been converted into the digital signals, generates pixel data of all the coordinate positions by linear complement for each color component of RGB independently and transmits the pixel data to a chromatic aberration of magnification correction unit 140.

Figure 2:
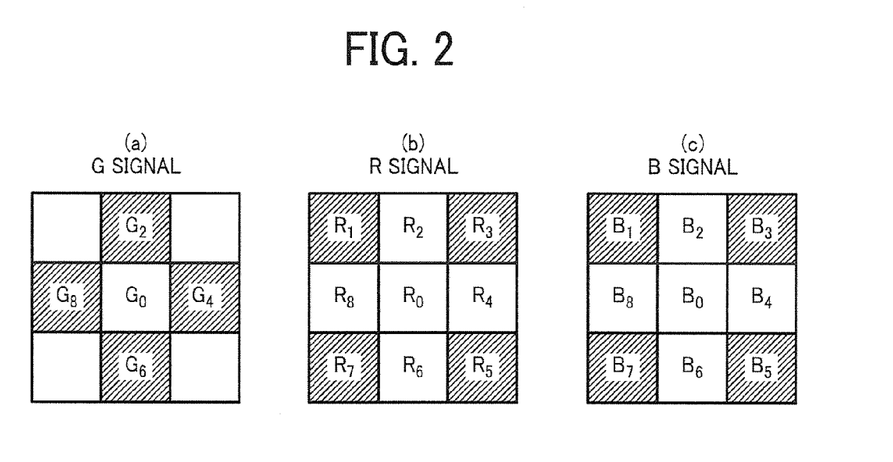
FIG. 2 is a diagram illustrating a color filter on Bayer arrangement.

FIG. 2 illustrates diagrams of color filters of Bayer arrangement. $G_0$ is obtained by the following relationship:

$$G_0=(G_2+G_4+G_6+G_8)/4 \quad (1)$$

$R_2$, $R_4$, $R_6$, $R_8$ and $R_0$ are obtained by the following relationships:

$$R_2=(R_1+R_3)/2 \quad (2)$$

$$R_4=(R_3+R_5)/2 \quad (3)$$

$$R_6=(R_5+R_7)/2 \quad (4)$$

$$R_8=(R_1+R_7)/2 \quad (5)$$

$$R_0=(R_1+R_3+R_5+R_7)/4 \quad (6)$$

$B_2$, $B_4$, $B_6$, $B_8$, $B_0$ are the same as the case of $R_2$, $R_4$, $R_6$, $R_8$ and $R_0$.

In this Embodiment, the pickup image having color filters having Bayer arrangement is described. Also, other image pickup elements having a different color filter arrangement such as CMYG arrangement and RGB+Ir (infrared) arrangement are also effective. The present invention is relatively more effective in the case of an image pickup element having such a four color filter arrangement than a three color type such as RGB because the four color type requires a memory having a further low latency or a RAM with 4 ports.

The chromatic aberration of magnification correction unit 140 inputs Bayer complemented RGB pixel elements, independently converts coordinates (coordinate conversion of chromatic aberration of magnification) for each color component of RGB based on the particular polynominal equations and outputs the RGB pixel data which have been corrected with regard to chromatic aberration of magnification. A memory having a low capacity with a low latency or a memory having a low capacity with multiple ports (e.g., SRAM) is used for the coordinate conversion for correcting chromatic aberration of magnification. The chromatic aberration of magnification correction unit 140 is described in detail below together with a distortion correction unit 160.

A modulation transfer function (MTF) correction 150 inputs RGB pixel data which has been corrected with regard to chromatic aberration of magnification, performs MTF correction using an FIR filter and outputs MTF corrected RGB pixel data.

Figure 3:
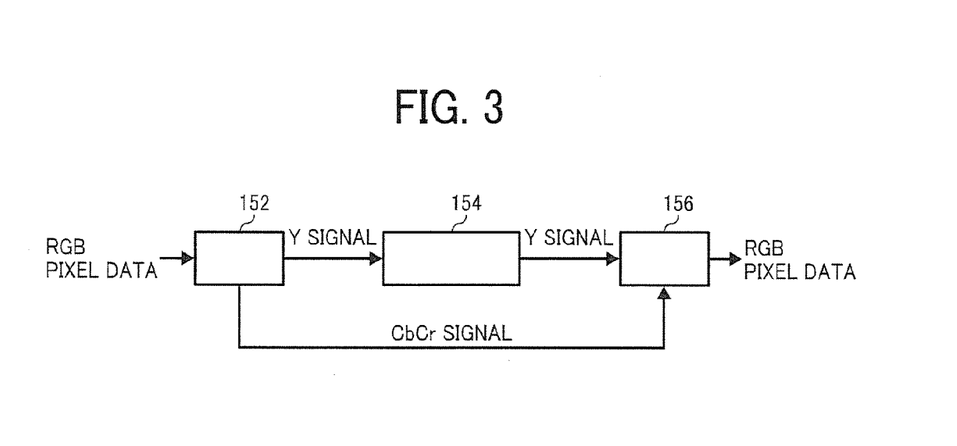
FIG. 3 is a schematic diagram illustrating MTF correction unit.

FIG. 3 is a schematic diagram illustrating the structure of the MTF correction unit 150. A conversion unit 152 converts the RGB pixel data into the YCbCr pixel data according to the following relationships:

$$Y=0.299R+0.587G+0114B \quad (7)$$

$$Cr=0.500R-0.419G-0.081B \quad (8)$$

$$Cb=-0.169R-0.332G+0.500B \quad (9)$$

An FIR filter (5×5) 154 inputs only a brightness signal Y among YCbCr and performs a particular MTF correction. High definition images can be obtained by filtering only Y signals (MTF correction) while reducing amplification of color noises. Since Y signal is filtered, MTF correction should be performed after correction of chromatic aberration of magnification. However, when MTF correction is performed after distortion correction, the conversion distance of coordinate conversion for the distortion correction is large as described later so that the calculation error easily occurs. This error is amplified by the MTF correction. Therefore, the MTF correction is preferably arranged after correction of chromatic aberration of magnification and before distortion correction as in this Embodiment.

A reverse conversion unit 156 inputs the CbCr signals and MTF corrected Y signals followed by reverse conversion according to the following relationships and outputs RGB pixel data.

$$R=Y+1.402Cr \qquad (10)$$

$$G=Y-0.714Cr-0.344Cb \qquad (11)$$

$$B=Y+1.772Cb \qquad (12)$$

A distortion correction unit 160 inputs RGB pixel data which have been corrected for chromatic aberration of magnification followed by MTF correction, performs the coordinate conversion (for distortion correction) for each color component of RGB according to particular polynominal equations and outputs distortion corrected RGB pixel data. A memory having a relatively large capacity (by which one entire image can be stored at maximum) with a high latency such as a DRAM in comparison with a memory for chromatic aberration of magnification can be used for the coordinate conversion at the distortion correction unit 160 since the memory is required to have only one port. As described above, the distortion correction unit 160 is described in detail later.

The RGB data output from the distortion correction unit 160 is input to a γ correction unit 170 and the γ correction unit 170 performs particular γ correction using the lookup tables for each of RGB and outputs γ corrected RGB pixel data.

This is the entire operation of the embodiment illustrated in FIG. 1.

Below is a detailed description about the chromatic aberration of magnification correction unit 140 and the distortion correction unit 160.

The principles of correction of the chromatic aberration of magnification and distortion are described below.

Figure 4:
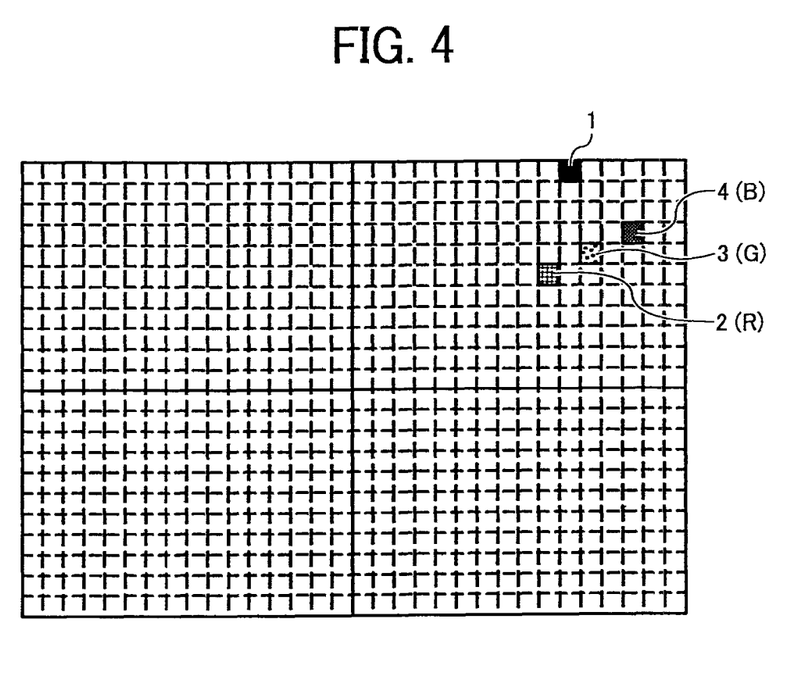
FIG. 4 is a diagram illustrating chromatic aberration of magnification and distortion.

As schematically illustrated in FIG. 4, when an image is taken with an optical system having chromatic aberration of magnification and distortion, the pixel data of the position (pixel) represented by 1 on the right top side are shifted from this original position 1 by the distortion and furthermore shifted differently for each component of RGB according to chromatic aberration of magnification. Resultantly, the positions actually imaged by the image pickup element are 2(R), 3(G) and 4(B) for RGB. The correction of chromatic aberration of magnification and distortion is that each component pixel data of RGB positioned at 2(R), 3(G) and 4(B) (pixel) are copied to the original position 1 (pixel), that is, the coordinates of each component pixel data are converted to their original positions.

Since the degree of the chromatic aberration of magnification and the degree of distortion are determined by the design data of an optical system, where each color component of RGB is shifted relative to the original position can be calculated.

Figure 5:
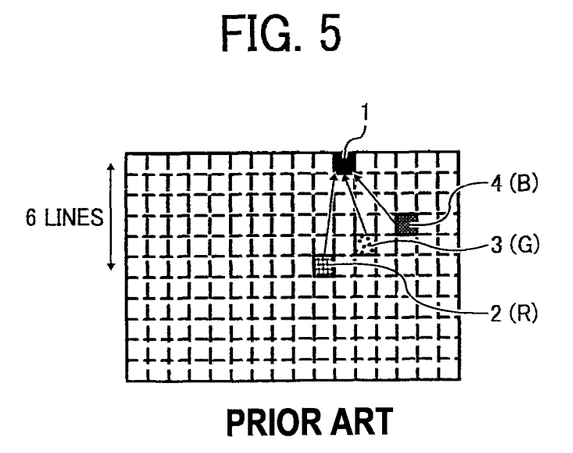
FIG. 5 is a diagram illustrating correction of chromatic aberration of magnification and distortion in a typical manner.

FIG. 5 is a schematic diagram illustrating a typical method of correcting chromatic aberration of magnification and distortion. Pixel data of each color component of RGB at 2(R), 3(G) and 4(B) are copied to the original position of 1, meaning that the coordinates thereof are converted to correct chromatic aberration of magnification and distortion at the same time. However, this typical method requires a large capacity memory with a low latency or multiple ports for each color component of RGB. For example, a high speed memory having 6 lines is necessary for coordinate conversion for each of RGB in the case illustrated in FIG. 5.

Figure 6:
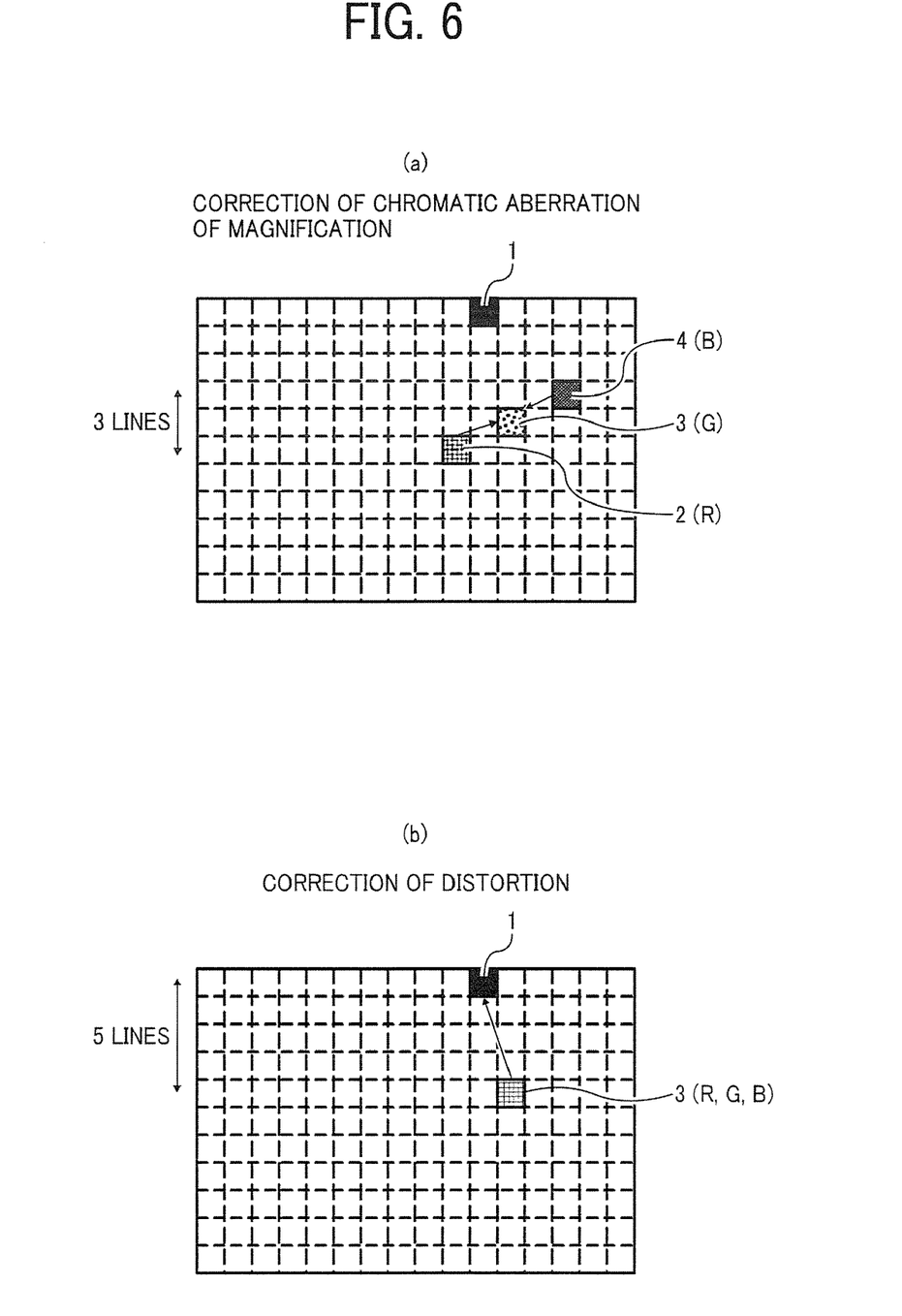
FIG. 6 is a diagram illustrating correction of chromatic aberration of magnification and distortion in the present invention.

FIG. 6 is a schematic diagram illustrating the method of the present invention of correcting chromatic aberration of magnification and distortion. The chromatic aberration of magnification varies depending on each color component with a small shift. On the other hand, the distortion has a large shift but is the same for each color component. The present inventor paid attention to this fact and corrects the chromatic aberration of magnification by converting the coordinated of pixel data of each color component of RGB (In the Embodiment, the color components of RB are converted and copied to the position of G) and the distortion by converting the RGB pixel data at one time which have been corrected with regard to the chromatic aberration of magnification. Thereby, a small capacity memory having a high speed performance (low latency or multiple ports) to correct chromatic aberration of magnification for each of RGB and a large capacity memory having a low speed performance (high latency or a single port) to correct distortion shared by RGB can be separately used as the memory for coordinate conversion in terms of function, which leads to cost reduction in total.

FIG. 6A is a schematic diagram illustrating correction of the chromatic aberration of magnification in the present invention and pixel data at the positions of 2(R) and 4(B) for the color components of RB are subject to coordinate conversion and copied to 3(G) for G. Thereby, the chromatic aberration of magnification is corrected. FIG. 6B is a schematic diagram illustrating correction of the distortion in the present invention and the pixel data at the position of 3 which have been corrected with regard to the chromatic aberration of magnification of each color component of RGB are subject to coordinate conversion at one time and copied to the original position of 1 (pixel). Thereby, the distortion is corrected.

A three line memory which can deal with each of RGB is sufficient as a high speed memory for correcting the chromatic aberration of magnification in Example of FIG. 6. Another five line memory is required to correct the distortion but a low speed memory shared by RGB can be used. The cost can be reduced as a whole in comparison with the typical example illustrated in FIG. 5.

The distortion referred to in the present invention represents distortion of a lens relative to the target projection system. Examples of such target projection systems are a projection system in which a look-down image is obtained from above the camera and a projection system in which an image is partially enlarged for display.

Figure 7:
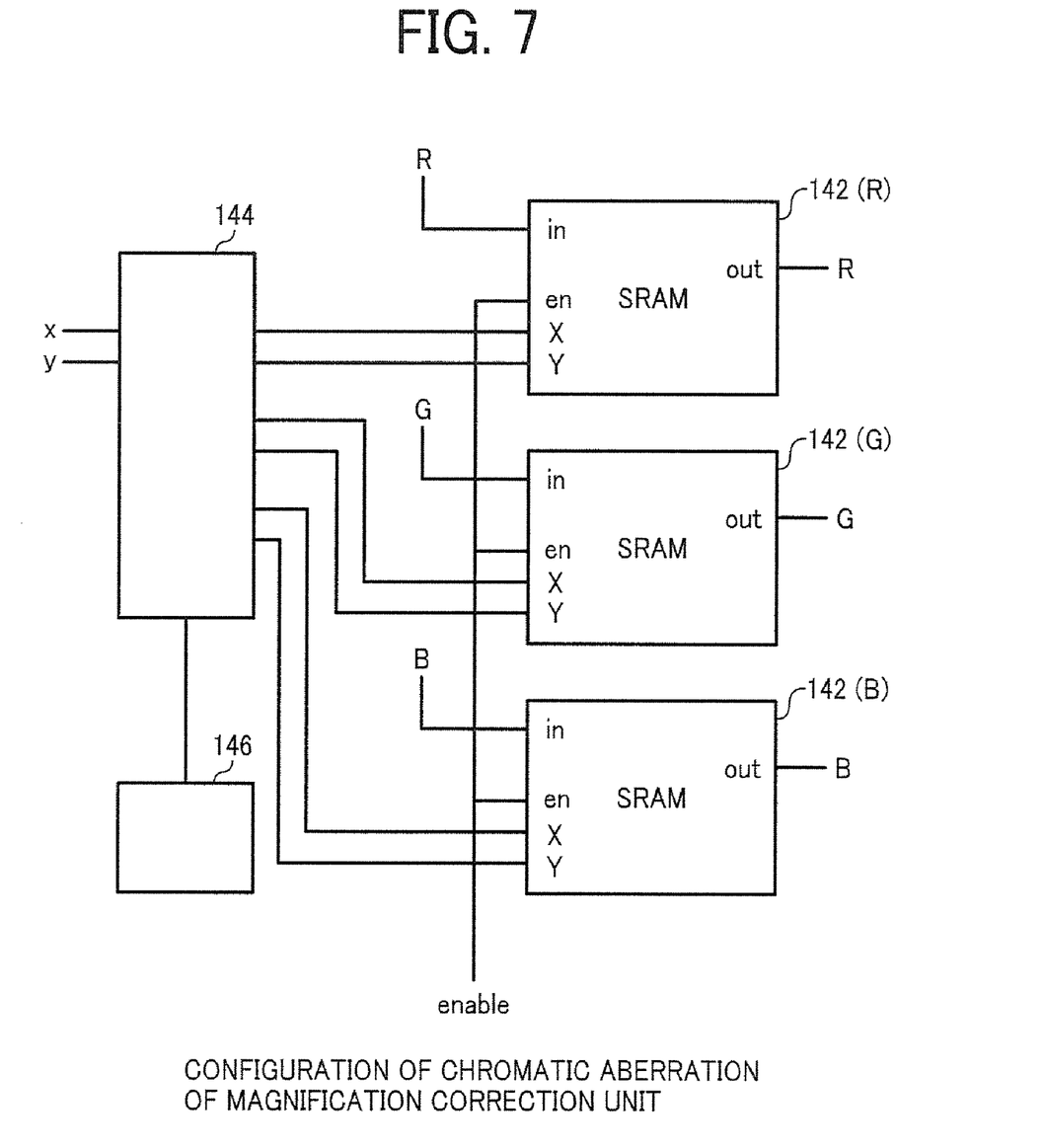
FIG. 7 is a diagram illustrating an Embodiment of chromatic aberration of magnification correction unit.

FIG. 7 is a configuration diagram illustrating an example of the chromatic aberration of magnification correction unit 140. 142 represents a coordinate conversion memory (line buffer) for correcting chromatic aberration of magnification and 142(R), 142(G) and 142(B) correspond to each color component of RGB. 144 represents a coordinate conversion computing unit for correcting chromatic aberration of magnification to calculate converted coordinates for correcting chromatic aberration of magnification for each of RGB according to particular coordinate conversion relationships. 146 represents a coordinate conversion coefficient table including the coefficients for use in the coordinate conversion relationships.

A small capacity memory with 3 ports for RGB or a low latency is required as a line buffer to correct chromatic aberration of magnification. For example, when the maximum shift amount of the chromatic aberration of magnification is assumed to be 20 lines in the Y direction, each of the coordinate conversion memories 142(R), 142(G) and 142(B) is formed of an SRAM for 20 lines. The size in the X direction is determined by the definition. For example, the size in the X direction is 640 dots when the definition is VGA (640×480). The color depth is RGB 8 bits and reading and writing are operated on 8 bits for the coordinate conversion memories 142(R), 142(G) and 142(B).

As described above, since the coordinate conversion memories (line buffers) 142(R), 142(G) and 142(B) for correcting chromatic aberration of magnification have small capacity, each of these coordinate conversion memories preferably has a configuration which secures a memory area accommodating 20 lines using a 3 port SRAM prepared in the image processing chip of the image pickup apparatus. In addition, a low latency memory such as an SRAM which has a single port can be used as a 3 port memory by time sharing.

Pixel data for each of RGB of an image having chromatic aberration of magnification and distortion are sequentially written from the front line into the coordinate conversion memories 142(R), 142(G) and 142(B) according to the coordinate data (x, y). After pixel data of 20 lines have been written for each, the pixel data are sequentially discarded from the front line when the pixel data of the successive lines are newly written. Each of the coordinate conversion memories 142(R), 142(G) and 142(B) sequentially stores the RGB pixel data corresponding to the amount of 20 lines at maximum required for the coordinate conversion for correcting chromatic aberration of magnification.

The coordinate data (x, y) indicates the reading position of an image for one frame. On the other hand, the coordinate conversion memories 142(R), 142(G) and 142(B) are line buffers for 20 lines. Since the writing lines vary in a cyclic manner, the coordinate data (x, y) are not directly used as the writing address for the coordinate conversion memories 142(R), 142(G) and 142(B). Thus, the values of the coordinate data (x, y) are converted to the real address of the coordinate conversion memories 142(R), 142(G) and 142(B). The configuration for this conversion is not shown in FIG. 7. This applies to the relationship between the coordinate data (x, y) after conversion in the reading operation described later and the reading address of the coordinate conversion memories 142(R), 142(G) and 142(B).

The coordinate conversion computing unit 144 for correcting chromatic aberration of magnification calculates converted coordinates for correcting chromatic aberration of magnification for each of RGB using the coordinate data (x, y) as input data according to particular coordinate conversion relationships such as polynominal equations and outputs coordinate data (X, Y) after conversion for each of RGB. As illustrated in FIG. 6A, the color components of RB are coordinate-converted and copied to the position of the color component of G in this Embodiment. Therefore, the coordinate conversion computing unit 144 for correcting chromatic aberration of magnification directly outputs the coordinate data (x, y) input for the component of G as the coordinate data (X, Y) after conversion. On the other hand, the coordinate conversion computing unit 144 for correcting chromatic aberration of magnification converts the coordinate data (x, y) respectively input for the color components of RB into the coordinate data (X, Y) using a particular coordinate conversion equation and outputs the coordinate data (X, Y) obtained after conversion. This operation is repeated for each coordinate data (x, y).

When the point of origin is set at the center of an image, the coordinate conversion equations are, for example, $$X = x + [a(1) + a(2) \times abs(x) + a(3) \times abs(y) + a(4) \times y^2] \times x$$

$$Y = y + [b(1) + b(2) \times abs(y) + b(3) \times abs(x) + b(4) \times x^2] \times y \quad (13).$$

In the relationship (13), abs( ) represents an absolute value, a(1) to a(4) and b(1) to b(4) represent coordinate conversion coefficients. The coordinate conversion coefficients are held in the coordinate conversion coefficient table 146 beforehand.

The coordinate conversion memories 142(R), 142(G) and 142(B) sequentially reads RGB pixel data based on the coordinate data (X, Y) (actually the values address converted from the coordinate data (X, Y) output from the coordinate conversion computing unit 144 for correcting chromatic aberration of magnification in parallel with (actually at a particular time behind) the writing operation described above. The pixel data of the color component of G at the position at the writing are read from the coordinate conversion memory 142(G). The pixel data of the color components of RB at the position shifted from the position when written in a particular amount, i.e. the amount corresponding to the chromatic aberration of magnification, are read from the coordinate conversion memories 142(R) and 142(B).

According to the processing described above, the RGB pixel data which have been corrected with regard to chromatic aberration of magnification are output from the coordinate conversion memories 142(R), 142(G) and 142(B).

Figure 8:
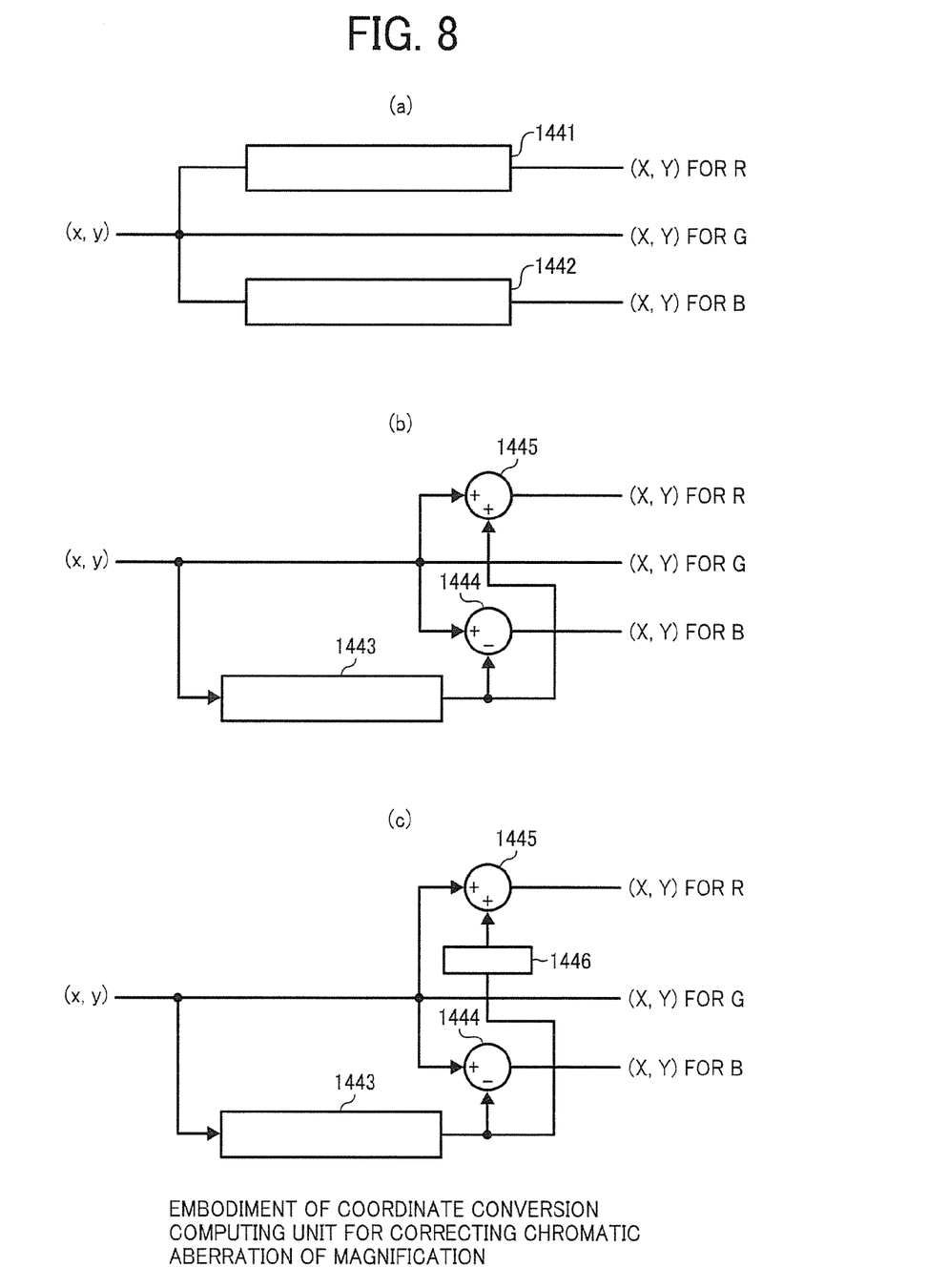
FIG. 8 is a diagram illustrating structures of Embodiments of coordinate conversion computing unit for correcting chromatic aberration of magnification.

FIG. 8 illustrates configuration examples of the coordinate conversion computing unit 144 for correcting chromatic aberration of magnification. FIG. 8A is an example in which the color component of G is not coordinate-converted and the input coordinate data (x, y) are directly output as the coordinate data (X, Y) for G, coordinate conversion computing units 1441 and 1442 convert only the coordinate data (x, y) input for the color components for R and B, respectively and output coordinate data (X, Y) for R and coordinate data (X, Y) for B after conversion. The coordinate conversion computing unit only deals with R and B components, which reduces the size of the circuit.

Examples represented by FIGS. 8B and 8C reflect the fact that R and B color components almost symmetrically shift relative to the color component of G with regard to the chromatic aberration of magnification in general (refer to FIG. 4). FIG. 8B represents an example in which a coordinate conversion computing unit 1443 obtains the amount of correction with regard to the coordinate data (x, y), a subtract unit 1444 subtracts the correction value from the coordinate data (x, y) to obtain the coordinate data (X, Y) for B and an addition unit 1445 adds the correction value to the coordinate data (x, y) to obtain the coordinate data (X, Y) for R. As in the case of FIG. 8A, the coordinate data (x, y) are output for the coordinate data (X, Y) for G.

FIG. 8C is an example in which the correction amount for R is furthermore adjusted by a gain circuit 1446 considering the shift from the symmetrical positions. Such a gain circuit can be provided on the B side instead of the R side. According to Examples of FIGS. 8B and 8C, only one coordinate conversion computing unit is required so that the size of the circuit can be furthermore reduced.

In addition, a look-up table (LUT) which stores the relationships between the input coordinate data (x, y) and the output coordinate data (X, Y) for each color component of R and B is prepared instead of the coordinate conversion computing units 1441 and 1442 of FIG. 8A to directly obtain the coordinate data (X, Y) after conversion of the coordinate data (x, y). Similarly, a look-up table (LUT) which stores the relationships between the input coordinate data (x, y) and the amount of correction is prepared instead of the coordinate conversion computing unit 1443 to directly obtain the amount of correction for the coordinate data (x, y). By this configuration, calculation for the coordinate conversion can be omitted and therefore, chromatic aberration of magnification can be basically corrected by a memory chip only.

Figure 9:
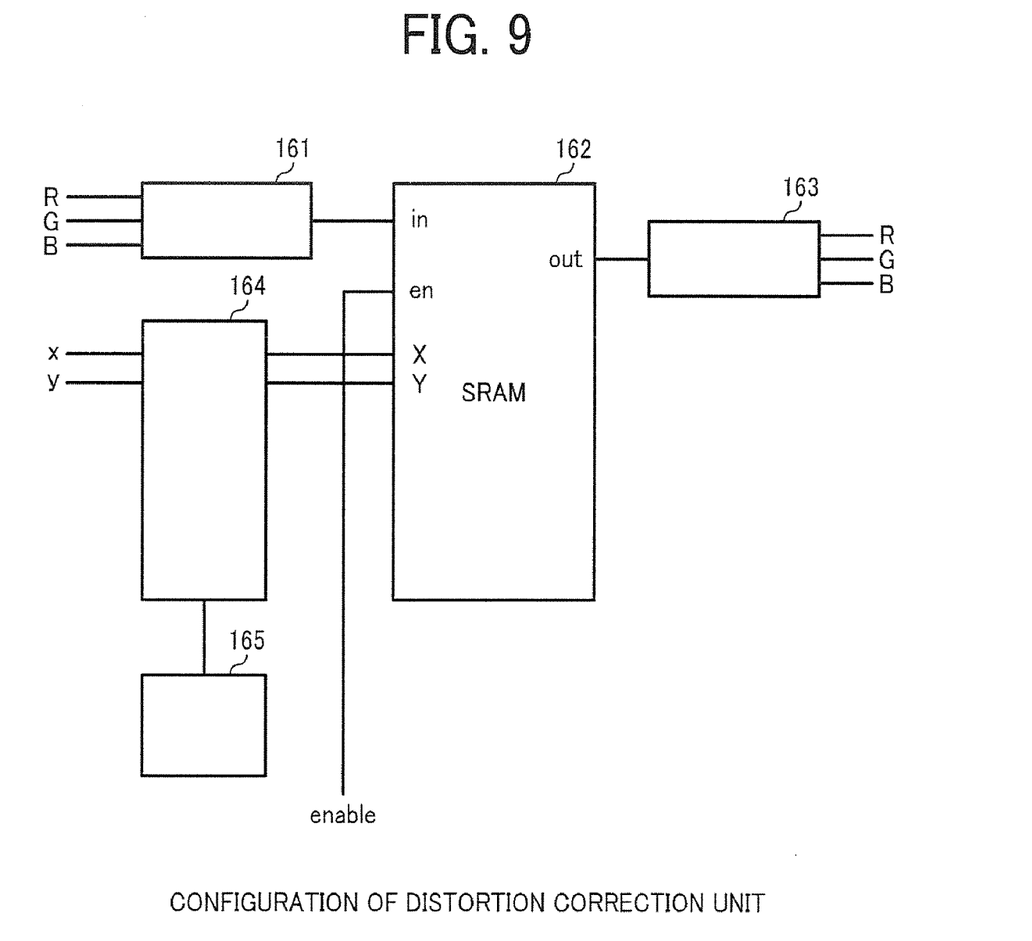
FIG. 9 is a diagram illustrating an Embodiment of distortion correction unit.

Next, FIG. 9 is a configuration diagram illustrating an example of a distortion correction unit 160. 161 represents an RGB synthesis unit to synthesize three pieces of pixel data for RGB. 162 represents a coordinate conversion memory (frame memory) for correcting distortion shared by RGB pixel data, 163 represents an RGB separation unit to separate the synthesized RGB pixel data into each original color component. 164 represents a distortion correction coordinate conversion computing unit to compute the converted coordinate to correct distortion according to a particular coordinate conversion equation. 165 represents a coordinate conversion coefficient table which holds coefficients for use in the coordinate conversion equation.

Since the amount of shift of a pixel is large with regard to distortion, a frame buffer capable of storing pixel data in an amount of one whole image at maximum is required for processing correction of distortion. On the other hand, since the amount of shift is the same for each color component of RGB, only one frame buffer having a total bid width of RGB pixel data is enough. In this Embodiment, the definition is VGA (640×480) and the number of bits (color depth) of respective RGB pixel data is 8 bits. The coordinate conversion memory 162 is formed of DRAMs having 640×480 dots based on 24 bits for writing and reading.

As described above, since the coordinate conversion memory (frame memory) 162 for correcting distortion has an extremely large capacity, it is difficult to have the coordinate conversion memory as an SRAM in an image processing chip in terms of cost and a single port memory is sufficient for RGB. Therefore, it is desired to use a DRAM prepared outside an image processing chip.

The RGB synthesis unit 161 synthesizes each of input pixel data (8 bits for each) of RGB which has been corrected with regard to chromatic aberration of magnification and outputs one piece of pixel data (24 bits). These synthesized RGB data are sequentially written from the front line into the coordinate conversion memory 162 according to the coordinate data (x, y).

On the other hand, the distortion correction coordinate conversion computing unit 164 computes the conversion coordinate to correct distortion shared by RGB according to particular coordinate conversion relationships equation such as polynominal equation using the input coordinate data (x, y) and outputs the coordinate data (X, Y) after conversion. The coordinate conversion relationships can be represented by the relationships (13) for the chromatic aberration of magnification correction. The coefficients in the relationships (13) are naturally different from each other. The coordinate conversion coefficients are included in the coordinate conversion coefficient table 165.

As described above, the coordinate conversion relationships for correcting the distortion are, for example, the same as the relationships (13) for correcting the chromatic aberration of magnification. The calculation results for correcting the chromatic aberration of magnification can be stored in a memory, etc. and assigned for terms of $x^2$, $y^2$, abs(x) and abs(y) in the relationships (13) for correcting the distortion. Therefore, there is no need for repeating the calculation, which reduces the size of the circuit of the distortion correction coordinate conversion computing unit 164.

The coordinate conversion memory 162 sequentially reads the RGB synthesis pixel data according to the coordinate data (X, Y) output from the distortion correction coordinate conversion computing unit 164 in parallel with the writing of the RGB synthesis pixel data (24 bits) (to be exact, reading starts a particular time behind writing). The RGB separation unit 163 separates the RGB synthesis pixel data (24 bits) read out from the coordinate conversion memory 162 into the pixel data (8 bits) of each original color component of RGB.

According to the processing described above, the RGB separation unit 163 outputs each RGB pixel data corrected with regard to the chromatic aberration of magnification and the distortion. That is, each of RGB pixel data is copied to its original position (x, y).

Also, a lookup table (LUT) which stores the relationships between the input coordinate data (x, y) and the output coordinate data (X, Y) can be prepared to obtain the coordinate data (X, Y) directly from the coordinate data (x, y) using the LUT with regard to the chromatic aberration of magnification. Thereby, the calculation for coordinate conversion is omitted and thus the chromatic aberration of magnification is basically corrected by a memory chip only.

This document claims priority and contains subject matter related to Japanese Patent Application No. 2007-304417, filed on Nov. 26, 2007, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An image pickup apparatus comprising:
a chromatic aberration of magnification correction device configured to correct chromatic aberration of magnification of an image by converting coordinates of multiple color components of pixel data of the image by using multiple first coordinate conversion memories respectively storing the multiple color components and moving at least two of the multiple color components within respective first coordinate conversion memories associated with said pixel data to a common pixel location different from an original pixel location of the pixel data such that the first coordinate conversion memories contain chromatic aberration of magnification corrected values; and
a distortion correction device configured to correct distortion of the image corrected with regard to the chromatic aberration of magnification by converting coordinates of the pixel data of multiple color components of the image simultaneously using a second coordinate conversion memory shared by the multiple color components and moving the chromatic aberration corrected values at the common pixel location to the original pixel location,
wherein the first coordinate conversion memories are memories having a first capacity with a first latency or a first capacity with multiple ports and the second coordinate conversion memory is a memory having a second capacity higher than the first capacity with a second latency higher than the first latency or a second capacity with a single port in comparison with the memories for the first coordinate conversion memories.

2. The image pickup apparatus according to claim 1, wherein the first coordinate conversion memories are SRAMs and the second coordinate conversion memory is a DRAM.

3. The image pickup apparatus according to claim 1, further comprising a far infrared (FIR) filter configured to filter a brightness signal and located between the chromatic aberration of magnification correction device and the distortion correction device.

4. The image pickup apparatus according to claim 1, wherein the common pixel location corresponds to the location of a green color component of said pixel data.

5. The image pickup apparatus according to claim 1, wherein the chromatic aberration of magnification correction device converts the coordinates of the pixel data of the multiple color components except for pixel data for a particular color component.

6. The image pickup apparatus according to claim 5, wherein the chromatic aberration of magnification correction device obtains an amount of correction based on coordinates of the particular color component, and conversion coordinates of each color component other than the particular color component are calculated based on the amount of correction.

7. The image pickup apparatus according to claim 5, wherein the multiple color components comprise red (R) signals, green (G) signals, and blue (B) signals, and the particular color component is green.

* * * * *